(12) United States Patent
Zhou et al.

(10) Patent No.: US 12,175,113 B2
(45) Date of Patent: Dec. 24, 2024

(54) METHOD, ELECTRONIC DEVICE, AND COMPUTER PROGRAM PRODUCT FOR FLUSHING DATA

(71) Applicant: EMC IP Holding Company LLC, Hopkinton, MA (US)

(72) Inventors: Qiaosheng Zhou, Beijing (CN); Ming Zhang, Beijing (CN); Chen Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 17/824,317

(22) Filed: May 25, 2022

(65) Prior Publication Data
US 2023/0128416 A1    Apr. 27, 2023

(30) Foreign Application Priority Data
Oct. 22, 2021  (CN) .......................... 202111233547.2

(51) Int. Cl.
*G06F 3/00* (2006.01)
*G06F 3/06* (2006.01)
*G06F 12/0804* (2016.01)

(52) U.S. Cl.
CPC .......... *G06F 3/0652* (2013.01); *G06F 3/0604* (2013.01); *G06F 3/0689* (2013.01); *G06F 12/0804* (2013.01); *G06F 3/0659* (2013.01)

(58) Field of Classification Search
CPC ... G06F 3/0652; G06F 3/0604; G06F 12/0804
See application file for complete search history.

(56) References Cited

U.S. PATENT DOCUMENTS

| | | | |
|---|---|---|---|
| 5,542,066 A | * | 7/1996 | Mattson .............. G06F 12/0804 |
| | | | 711/E12.04 |
| 9,934,163 B1 | | 4/2018 | Armangau et al. |
| 10,810,123 B1 | | 10/2020 | Xu et al. |
| 2019/0266098 A1 | * | 8/2019 | Torchalski .......... G06F 12/0811 |
| 2021/0248124 A1 | | 8/2021 | Tobin et al. |
| 2022/0027059 A1 | | 1/2022 | Chen et al. |

OTHER PUBLICATIONS

Zhang, Ming, et al.; "Method, Electronic Device and Computer Program Product for Flushing Metadata," U.S. Appl. No. 17/746,367, filed May 17, 2022.

* cited by examiner

*Primary Examiner* — Reginald G Bragdon
*Assistant Examiner* — Michael L Westbrook
(74) *Attorney, Agent, or Firm* — BainwoodHuang

(57) ABSTRACT

In techniques for flushing data, based on a maturity level of a storage segment, the storage segment is inserted into a list to be flushed corresponding to the maturity level in a plurality of lists to be flushed, the plurality of lists to be flushed respectively correspond to different maturity levels, and the maturity level at least indicates a proportion of the number of data-written blocks to the total number of blocks of the storage segment; and the list to be flushed for the corresponding maturity level in the plurality of lists to be flushed is flushed to a disk array according to a descending order of the maturity levels. In this way, the bandwidth utilization of the disk array can be improved.

11 Claims, 5 Drawing Sheets

METHOD, ELECTRONIC DEVICE, AND COMPUTER PROGRAM PRODUCT FOR FLUSHING DATA

CROSS-REFERENCE TO RELATED APPLICATION

This application claims priority to Chinese Patent Application No. CN202111233547.2, on file at the China National Intellectual Property Administration (CNIPA), having a filing date of Oct. 22, 2021, and having "A METHOD, ELECTRONIC AND COMPUTER PROGRAM PRODUCT FOR FLUSHING DATA" as a title, the contents and teachings of which are herein incorporated by reference in their entirety.

TECHNICAL FIELD

Embodiments of the present disclosure relate to the field of data storage, and more particularly relate to a method, an electronic device, and a computer program product for flushing data.

BACKGROUND

The flushing efficiency of a dynamic random access memory (DRAM) cache is critical to the performance of the entire storage system. Cache write mechanisms are classified into a write-through mode and a write-back mode. In the write-through mode, data is written to a cache and a back-end disk at the same time. In the write-back mode, after data is written into the cache by input and output (10) operations, the cached data is flushed to a back-end disk according to a flushing strategy. Generally, the DRAM cache operates in the write-back mode.

The disk array technology is a common back-end disk management technology for current commercial servers. A redundant array of independent disks (RAID), as a redundant disk array, can provide an independent large-scale storage device solution. The read and write performance of a disk array may be several times that of a single disk.

SUMMARY OF THE INVENTION

In a first aspect of the present disclosure, a method for flushing data is provided. The method includes inserting, based on a maturity level of a storage segment, the storage segment into a list to be flushed corresponding to the maturity level in a plurality of lists to be flushed, the plurality of lists to be flushed respectively corresponding to different maturity levels, and the maturity level at least indicating a proportion of the number of data-written blocks to the total number of blocks of the storage segment. The method further includes flushing the list to be flushed for the corresponding maturity level in the plurality of lists to be flushed into a disk array according to a descending order of the maturity levels.

In a second aspect of the present disclosure, an electronic device is provided. The electronic device includes a processor and a memory coupled to the processor, the memory having instructions stored therein which, when executed by the processor, cause the device to perform actions. The actions include inserting, based on a maturity level of a storage segment, the storage segment into a list to be flushed corresponding to the maturity level in a plurality of lists to be flushed, the plurality of lists to be flushed respectively corresponding to different maturity levels, and the maturity level at least indicating a proportion of the number of data-written blocks to the total number of blocks of the storage segment. The actions further include flushing the list to be flushed for the corresponding maturity level in the plurality of lists to be flushed into a disk array according to a descending order of the maturity levels.

In a third aspect of the present disclosure, a computer program product is provided. The computer program product is tangibly stored on a computer-readable medium and includes machine-executable instructions, wherein the machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings. In the example embodiments of the present disclosure, the same reference numerals generally represent the same members. In the accompanying drawings.

DETAILED DESCRIPTION

Figure 1:
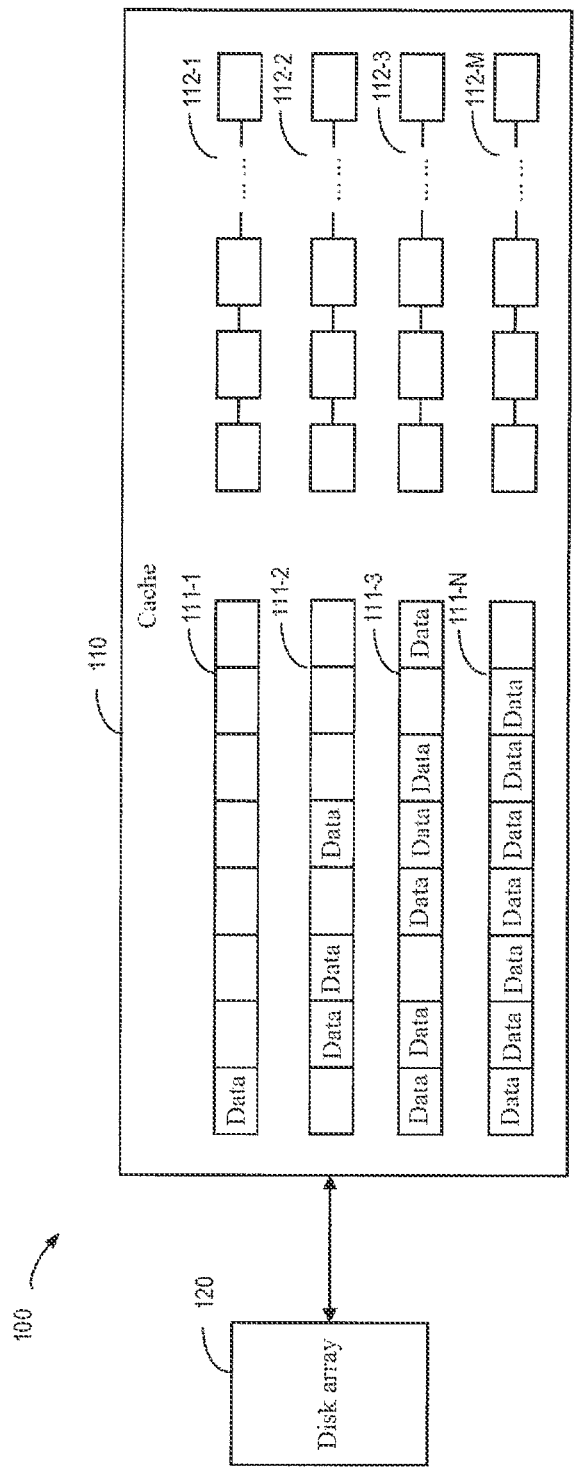
FIG. 1 shows a schematic diagram of an example environment in which embodiments of the present disclosure can be implemented.

The individual features of the various embodiments, examples, and implementations disclosed within this document can be combined in any desired manner that makes technological sense.

Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not in any way limit the scope of the present disclosure.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

In traditional technology, there are two known flushing strategies: flushing sorted by time and flushing sorted by logical block addresses (LBAs) of a back-end disk. The two flushing strategies each have respective pros and cons.

When using the time-sorting flushing strategy, storage segments in a cache that need to be flushed are usually in the form of a first-in-first-out (FIFO) queue. Data written to the queue first will be flushed to the back-end disk first. The time-sorting flushing strategy has the advantages of simplicity and efficiency. However, since the location where data is flushed to the back-end disk is random, the storage segments with adjacent logical block addresses in the back-end disk may be scattered in a plurality of flushes, resulting in that the access to the back-end disk is random. Disk addressing is usually linear addressing based on LBA addresses. Random access to the back-end disk results in a reduced addressing efficiency and a high bandwidth occupancy rate of the back-end disk.

The LBA-sorting flushing strategy solves the above problem of random accessing the disk and can reduce the bandwidth occupancy rate of the back-end disk. However, the strategy requires continuous maintenance of a complex data structure (for example, a red-black tree) balance. Regardless of the amount of data in storage segments, when each storage segment is inserted or deleted, the balance operation needs to be adjusted according to the storage address indicated by the storage segment.

In addition, the LBA-sorting flushing strategy is friendly to a back-end disk with a single physical disk. However, increasingly more storage systems now adopt the form of a plurality of physical disks such as a disk array. In a disk array (for example, RAID), several physical disks are combined into a larger virtual device. In the form of stripes, read and write requests for data are scattered to various disks to achieve the purpose of "simultaneous" reading/writing of data, thereby improving performance. Therefore, for such a disk array, it is expected that more data can be written to each stripe in a single flush. The LBA-sorting flushing strategy does not consider the concept of stripes of the disk array.

The embodiment of the present disclosure proposes a data flushing solution, in which based on a maturity level of a storage segment to be flushed, the storage segment is inserted into a list to be flushed corresponding to the maturity level in a plurality of lists to be flushed. Then, according to a descending order of the maturity levels, the list to be flushed for the corresponding maturity level in the plurality of lists to be flushed is flushed to a disk array.

According to the embodiment described herein, by preferentially flushing a storage segment with a high maturity level to the disk array, more data can be written to a stripe in a single flush, thereby improving the bandwidth utilization of the disk array and reducing the occupation of system resources.

The basic principles and some example implementations of the present disclosure will be described below with reference to the accompanying drawings. It should be understood that these example embodiments are given only to enable those skilled in the art to better understand and thus implement the embodiments of the present disclosure, and are not intended to limit the scope of the present disclosure in any way.

FIG. 1 shows a schematic diagram of example environment 100 in which embodiments of the present disclosure can be implemented. As shown in FIG. 1, environment 100 includes cache 110 and disk array 120. When IO operations write data to cache 110, data for different IO operations is stored in storage segments of cache 110. FIG. 1 shows storage segment 111-1, storage segment 111-2, storage segment 111-3, and storage segment 111-N (also collectively or individually referred to as "storage segment 111"), where N is a natural number. Each storage segment 111 indicates a storage address in disk array 120. Storage segment 111 includes a plurality of blocks, and the data written by the IO operations is stored in the blocks. When flushing data to disk array 120 (e.g., writing the data from the cache 110 to the disk array 120), the data stored in the same storage segment 111 will be flushed to a storage address of disk array 120 indicated by storage segment 111.

A plurality of lists to be flushed according to an embodiment of the present disclosure are stored in cache 110. FIG. 1 shows list to be flushed 112-1, list to be flushed 112-2, list to be flushed 112-3, and list to be flushed 112-M (also collectively or individually referred to as "list to be flushed 112"), where M is a natural number. Each list to be flushed 112 includes a node for inserting storage segment 111. Before flushing the data stored in storage segment 111 to disk array 120, storage segment 111 is inserted into list to be flushed 112 based on a respective maturity level. This will be described in detail below with reference to FIG. 2.

Disk array 120 can communicate with cache 110. Data can be flushed from cache 110 to disk array 120, or can be read from disk array 120 to cache 110. Although disk array 120 is shown as a whole in FIG. 1, disk array 120 actually includes a plurality of physical disks.

It should be understood that the structure and functions of environment 100 are described for illustrative purposes only and do not imply any limitation to the scope of the present disclosure. For example, the embodiments of the present disclosure may also be applied to an environment different from environment 100. In addition, FIG. 1 only shows four storage segments in the cache, but it is not limited thereto. There may be more or fewer storage segments in the cache. Although FIG. 1 only shows that each storage segment includes 8 blocks, it is not limited thereto, and each storage segment may also include more or fewer blocks.

Figure 2:
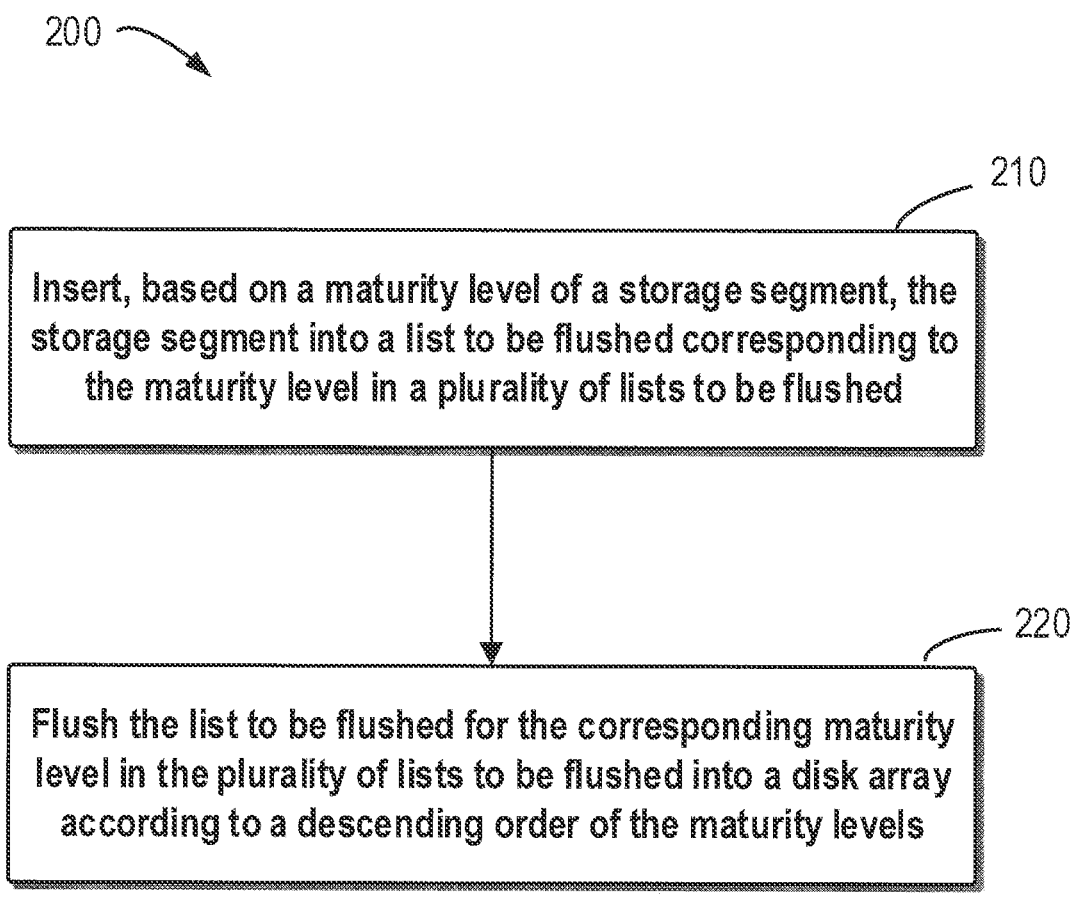
FIG. 2 shows a flow chart of an example method for flushing data according to an embodiment of the present disclosure.

FIG. 2 shows a flow chart of example method 200 for flushing data according to an embodiment of the present disclosure. Method 200 can be performed, for example, in environment 100 as shown in FIG. 1. It should be understood that method 200 may also include additional actions not shown and/or may omit actions shown, and the scope of the present disclosure is not limited in this regard. Method 200 will be described in detail below with reference to FIG. 1.

At block 210, based on a maturity level of storage segment 111, storage segment 111 is inserted into list to be flushed 112 corresponding to the maturity level in a plurality of lists to be flushed 112. The maturity level refers to a proportion of the number of data-written blocks to the total number of blocks in storage segment 111. Different lists to be flushed 112 correspond to different maturity levels.

A proportion indicated by the lowest maturity level is greater than zero. A proportion indicated by each maturity level may be set according to actual needs. For example, in some embodiments, the highest maturity level may be set to a proportion of 100%, that is, all blocks in storage segment 111 have been written with data (also can be referred to as "storage segment 111 is full"). In some embodiments, storage segment 111 may generally not be full, so the proportion indicated by the highest maturity level may be set to be lower, such as 93.75%, 87.5%, 80%, 75%, 62.5%, 50%, 37.5%, or less.

The division granularity of the maturity level may also be set according to actual needs. For example, in some embodiments, each storage segment 111 has 8 blocks as shown in FIG. 1. If the highest maturity level is set to 100%, and the division granularity is set to 25%, there will be 4 maturity levels: Level 1 25%, Level 2 50%, Level 3 75%, and Level 4 100% (that is, every two data-written blocks form one level).

Lists to be flushed 112-1, 112-2, 112-3, and 112-M correspond to the 4 maturity levels respectively. Assume that list to be flushed 112-1 corresponds to Level 1, list to be flushed 112-2 corresponds to Level 2, list to be flushed 112-3 corresponds to Level 3, and list to be flushed 112-M corresponds to Level 4. Then, when a proportion of the number of data-written blocks in storage segment 111 is not higher than 25% (for example, storage segment 111-1), storage segment 111-1 is inserted into list to be flushed 112-1. When the proportion is higher than 25% and not higher than 50% (for example, storage segment 111-2), storage segment 111-2 is inserted into list to be flushed 112-2. When the proportion is higher than 50% and not higher than 75% (for example, storage segment 111-3), storage segment 111-3 is inserted into list to be flushed 112-3. When the proportion is higher than 75% (for example, storage segment 111-N), storage segment 111-N is inserted into list to be flushed 112-M.

In some embodiments, the number of maturity levels may be set to be equal to the total number of blocks of storage segment 111. That is, division of the maturity level is performed in the smallest granularity. Each time a block is written, the maturity level is increased by one level.

Then, at block 220, according to a descending order of the maturity level, list to be flushed 112 for the corresponding maturity level in the plurality of lists to be flushed 112 is flushed to disk array 120. For example, list to be flushed 112-M as shown in FIG. 1 corresponds to the highest maturity level, so the list is flushed to disk array 120 first. List to be flushed 112-1 is the final one flushed as it corresponds to the lowest maturity level.

When flushing to disk array 120, according to the order of storage segments 111 inserted in lists to be flushed 112 in the lists, data written in storage segments 111 is flushed sequentially to the storage addresses of disk array 120 indicated by storage segments 111.

In this way, by preferentially flushing a storage segment with a high maturity level to the disk array, more data can be written to the stripe of disk array 120 in a single flush, thereby improving the bandwidth utilization of the disk array.

In some embodiments, in response to an increase in the number of data-written blocks in storage segment 111, the maturity level of storage segment 111 is updated. Then, based on the updated maturity level of storage segment 111, storage segment 111 is inserted into list to be flushed 112 corresponding to the updated maturity level. During the flushing of list to be flushed 112 with a higher maturity level, storage segment 111 that has been inserted into list to be flushed 112 with a lower maturity level can be taken out. Storage segment 111 taken out is not full, and there is still an available block, which can be used to store new data written by the IO operation. Next, such an embodiment will be described in detail with reference to FIG. 1 and FIG. 3.

Figure 3:
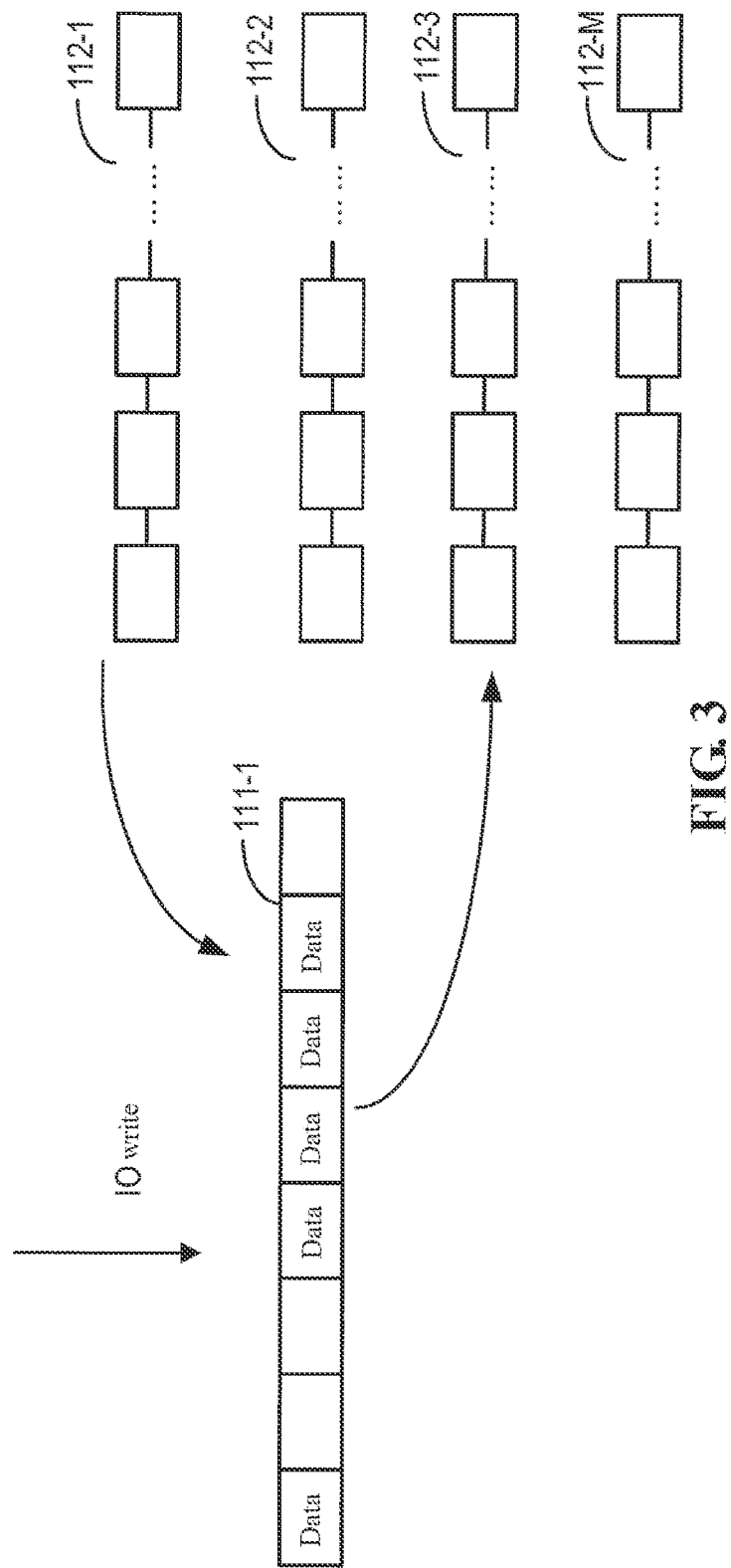
FIG. 3 shows a schematic diagram of re-inserting a storage segment based on an updated maturity level according to some embodiments of the present disclosure.

FIG. 3 shows a schematic diagram of re-inserting storage segment 111 based on an updated maturity level according to some embodiments of the present disclosure. In FIG. 3, storage segment 111-1 whose original maturity level is Level 1 is taken out from list to be flushed 112-1 at the corresponding level. Then, 4 pieces of new data written by the new IO operation are stored in storage segment 111-1. Therefore, the maturity level of storage segment 111-1 is updated from Level 1 to Level 3. Therefore, based on the updated maturity level, storage segment 111-1 should be inserted into list to be flushed 112-3 corresponding to Level 3.

In some embodiments, even if list to be flushed 112 is being flushed, inserted storage segment 111 that has not been flushed can be taken out and re-inserted as described above. Or, updated storage segment 111 may be inserted into the node that is not flushed in list to be flushed 112 that is being flushed.

In this way, it can be ensured as much as possible that a storage segment with a higher maturity level is flushed every time disk array 120 is flushed. Therefore, more data can be written into the stripe of disk array 120 in a single flush, which can further improve the bandwidth utilization of the disk array.

Figure 4:
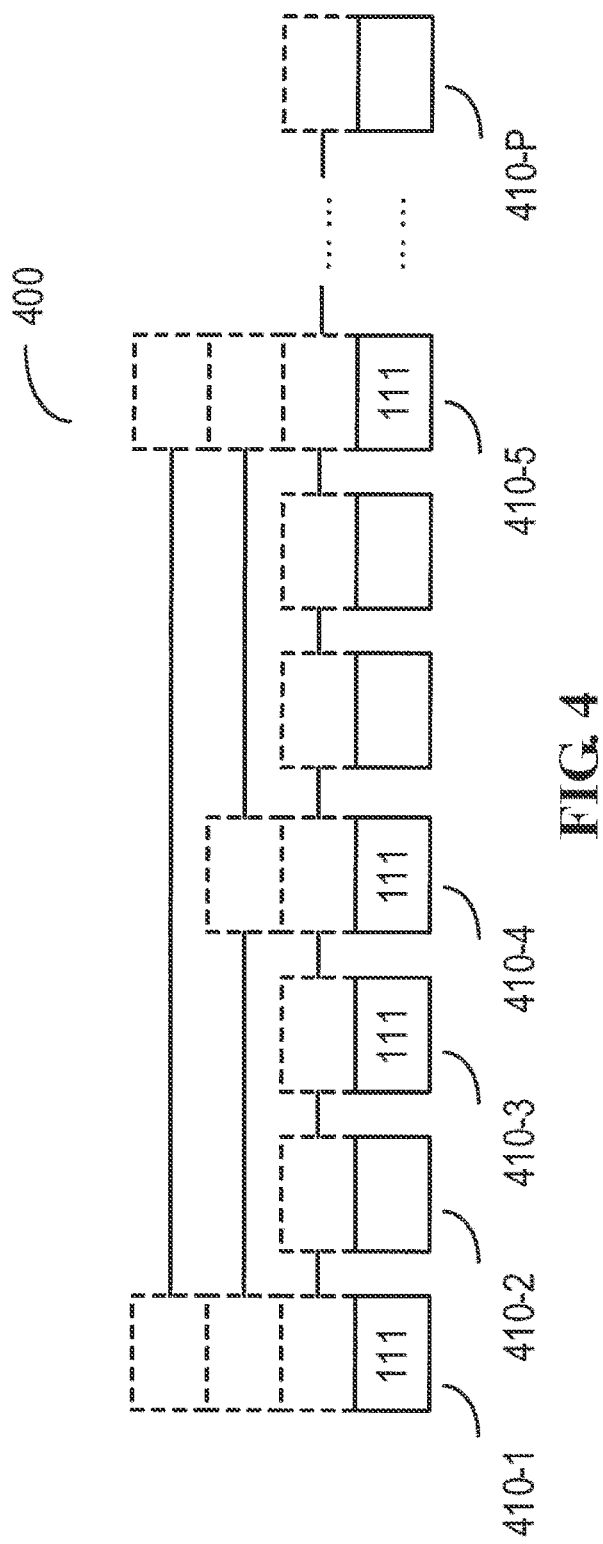
FIG. 4 shows a schematic diagram of a jump list to be flushed according to some embodiments of the present disclosure.

FIG. 4 shows a schematic diagram of jump list to be flushed 400 according to some embodiments of the present disclosure. Jump list to be flushed list 400 may be an example implementation of one or more lists to be flushed in the form of a jump list in the lists to be flushed 112 shown in FIG. 1, for example, list to be flushed 112-M.

In some embodiments, in response to that the proportion of the number of data-written blocks to the total number of blocks in storage segment 111 is greater than the threshold proportion, based on the maturity level and the storage address of disk array 120 indicated by storage segment 111, storage segment 111 is inserted into jump list to be flushed 400 corresponding to the corresponding maturity level in one or more jump lists to be flushed 400. The threshold proportion may be set according to actual needs. For example, in lists to be flushed 112 at the four maturity levels as shown in FIG. 1, if the above threshold proportion is set to 50%, list to be flushed 112-3 and list to be flushed 112-M will be two jump lists to be flushed 400 in the form of jump lists.

As shown in FIG. 1, there are 7 data-written blocks in storage segment 111-N, and a proportion to the total number of blocks is 87.5%, which is higher than the threshold proportion 50%. Moreover, the maturity level of storage segment 111-N is Level 4, so storage segment 111-N should be inserted into jump list to be flushed 400 (i.e., list to be flushed 112-M in the form of a jump list) shown in FIG. 4.

Next, the insertion of storage segment 111-N will be described with reference to FIG. 4.

The jump list to be flushed 400 includes node 410-1, node 410-2, node 410-3, node 410-4, node 410-5, and node 410-P (also collectively referred to as or individually called "node 410") for storage segment 111 to insert, where P is a natural number. Each node 410 includes at least a first-level index pointing to next node 410. For example, the first-level index of node 410-1 points to node 410-2, the first-level index of node 410-2 points to node 410-3, and so on.

Some nodes (for example, node 410-1, node 410-4, and node 410-5) in node 410 also include a second-level index. The second-level index points to next node 410 including the second-level index. For example, the second-level index of node 410-1 points to node 410-4, and the second-level index of node 410-4 points to node 410-5.

Some nodes (for example, node 410-1 and node 410-5) in node 410 including the second-level index also include a third-level index. The third-level index points to next node 410 including the third-level index. For example, the third level index of node 410-1 points to node 410-5.

When inserting storage segment 111-N into jump list to be flushed list 400, first, the storage address in disk array 120 indicated by storage segment 111-N is compared with the storage address indicated by inserted storage segment 111 in node 410 (e.g., node 410-1 and node 410-5) including the third-level index. By comparison, it is found that the storage address indicated by storage segment 111-N is greater than the storage address indicated by storage segment 111 that has been inserted in node 410-1, and is smaller than the storage address indicated by storage segment 111 that has been inserted in node 410-5. Therefore, it is determined that a third-level index range into which storage segment 111-N should be inserted is a range between node 410-1 and node 410-5.

Next, within the determined third-level index range, the storage address indicated by storage segment 111-N is compared with the storage address indicated by storage segment 111 that has been inserted in node 410 (e.g., node 410-4) including the second-level index. Through comparison, it is found that the storage address indicated by storage segment 111-N is smaller than the storage address indicated by storage segment 111 that has been inserted in node 410-4. Therefore, it is determined that a second-level index range into which storage segment 111-N should be inserted is a range between node 410-1 and node 410-4.

Finally, within the determined second-level index range, the storage address indicated by storage segment 111-N is respectively compared with the storage address indicated by storage segment 111 that has been inserted in another node 410 (e.g., node 410-3) in the range. Through comparison, it is found that the storage address indicated by storage segment 111-N is smaller than the storage address indicated by storage segment 111 that has been inserted in node 410-3. Therefore, it is determined that storage segment 111-N should be inserted into node 410-2.

A distance between nodes 410 including the third-level index (for example, a distance between node 410-1 and node 410-5) corresponds to a maximum flushing range of disk array 120 that allows a single flush. A distance between nodes 410 including the second-level index (for example, a distance between node 410-1 and node 410-4) corresponds to a stripe size of disk array 120. The storage segments inserted into the same third-level index range will be flushed to disk array 120 using the same thread. The storage segments inserted into the same second-level index range will be flushed to the same stripe of disk array 120. The size of the third-level index range and the size of the second-level index range vary according to the type and width of disk array 120. The width of disk array 120 refers to the number of physical disks combined as a whole.

When flushing jump list to be flushed 400 to disk array 120, threads corresponding to the number of nodes 410 including the third-level index are allocated. By using the allocated threads, jump list to be flushed 400 is flushed starting from a plurality of nodes 410 including the third-level index.

In this way, by storing a storage segment with a higher maturity level in the form of a jump list, more data can be flushed to more stripes of the disk array 120 in a single flush. Thereby, the flushing efficiency is improved, and the bandwidth utilization rate of disk array 120 is further improved.

In some other embodiments, in response to that the proportion of the number of data-written blocks to the total number of blocks in storage segment 111 is less than or equal to the threshold proportion, storage segment 111 is inserted, based on the maturity level, into a FIFO flushing list corresponding to the maturity level in one or more FIFO flushing lists. If the threshold proportion is set to 50%, list to be flushed 112-1 and list to be flushed 112-2 will be FIFO flushing lists in a first-in first-out form. In this way, the problem that storage segment 111 with a low maturity level still needs to maintain a complicated flushing list can be avoided, and system resource occupation can be reduced.

Figure 5:
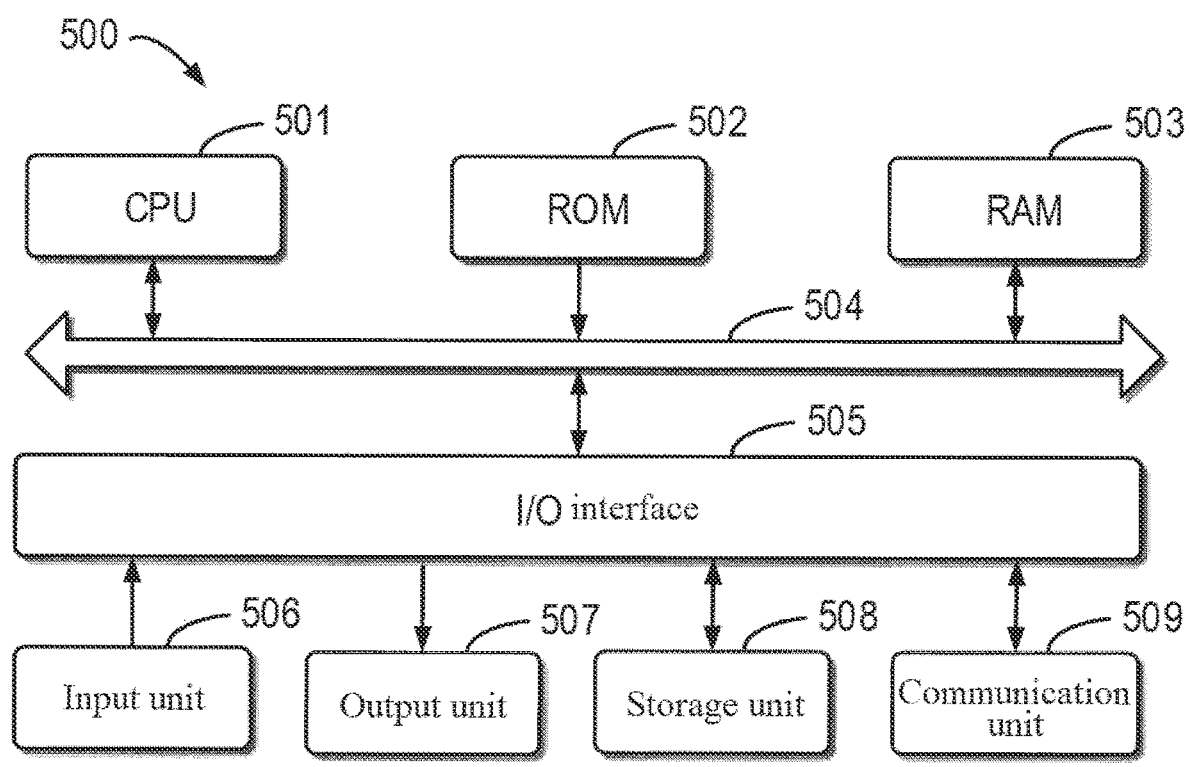
FIG. 5 is a block diagram of an example device that can be used to implement embodiments of the present disclosure.

FIG. 5 illustrates a schematic block diagram of example device 500 that can be used to implement embodiments of the present disclosure. For example, cloud server 110 as shown in FIG. 1 may be implemented by device 500. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by processing unit 501. For example, in some embodiments, method 200 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for flushing data, comprising:
inserting, based on a maturity level of a storage segment, the storage segment into a list to be flushed having a corresponding maturity level corresponding to the maturity level of the storage segment in a plurality of lists to be flushed, individual ones of the plurality of lists to be flushed respectively corresponding to different maturity levels, and the maturity level at least indicating a proportion of the number of data-written blocks to the total number of blocks of the storage segment, wherein inserting the storage segment into the list based on the maturity level comprises:
in response to the proportion being greater than a threshold proportion, inserting, based on the maturity level and a storage address indicated by the storage segment, the storage segment into a jump list corresponding to the maturity level, wherein the jump list comprises a plurality of nodes, wherein the jump list is one of the plurality of lists to be flushed, wherein the inserting is performed at least in part by comparing the storage address indicated by the storage segment to at least one storage address indicated by at least one other storage segment that was previously inserted into the jump list, in order to identify a node within the jump list into which the storage segment is inserted; and
flushing the list to be flushed for the corresponding maturity level in the plurality of lists to be flushed into a disk array according to a descending order of the maturity levels.

2. The method according to claim 1, wherein the node within the jump list into which the storage segment is inserted comprises at least a first-level index pointing to a next node within the jump list that also includes a first-level index, and wherein each node within the jump list includes a first-level index,
wherein a plurality of the nodes within the jump list each further comprise a second-level index, each second-level index pointing to a next node within the jump list that also includes a second-level index, and wherein some nodes within the jump list do not include a second-level index,
wherein a plurality of nodes within the nodes in the jump list each further comprise a third-level index, each third-level index pointing to a next node within the jump list that also includes a third-level index, wherein some nodes within the jump list do not include a third-level index, and
wherein those storage segments that are inserted between a sequential pair of nodes within the jump list that each include a third-level index are all flushed by a single thread in a single flush, and wherein those storage segments that are inserted between a sequential pair of nodes within the jump list that include a second-level index are all flushed to a single stripe.

3. The method according to claim 2, further comprising:
allocating a total number of threads corresponding to a total number of nodes in the jump list that each include a third-level index; and
flushing, using the allocated threads, the storage segments inserted into the jump list.

4. The method according to claim 1, wherein flushing the list to be flushed for the corresponding maturity level in the plurality of lists to be flushed to the disk array comprises:
flushing data that has been written in the storage segment inserted in the list to be flushed to the storage address of the disk array indicated by the storage segment.

5. The method according to claim 1, further comprising:
in response to an increase in the number of data-written blocks in the storage segment, updating the maturity level of the storage segment; and
based on the updated maturity level of the storage segment, inserting the storage segment into the list to be flushed corresponding to the updated maturity level.

6. An electronic device, comprising:
a processor; and
a memory coupled to the processor, the memory having instructions stored therein, wherein the instructions, when executed by the processor, cause the device to perform actions comprising:
inserting, based on a maturity level of a storage segment, the storage segment into a list to be flushed having a corresponding maturity level corresponding to the maturity level of the storage segment in a plurality of lists to be flushed, individual ones of the plurality of lists to be flushed respectively corresponding to different maturity levels, and the maturity level at least indicating a proportion of the number of data-written blocks to the total number of blocks of the storage segment, wherein inserting the storage segment into the list based on the maturity level comprises:
in response to the proportion being greater than a threshold proportion, inserting, based on the maturity level and a storage address indicated by the storage segment, the storage segment into a jump list corresponding to the maturity level, wherein the jump list comprises a plurality of nodes, wherein the jump list is one of the plurality of lists to be flushed, wherein the inserting is performed at least in part by comparing the storage address indicated by the storage segment to at least one storage address indicated by at least one other storage segment that was previously inserted into the jump list, in order to identify a node within the jump list into which the storage segment is inserted; and
flushing the list to be flushed for the corresponding maturity level in the plurality of lists to be flushed into a disk array according to a descending order of the maturity levels.

7. The electronic device according to claim 6, wherein the node within the jump list into which the storage segment is inserted comprises at least a first-level index pointing to a next node within the jump list that also includes a first-level index, and wherein each node within the jump list includes a first-level index,
wherein a plurality of the nodes within the jump list each further comprise a second-level index, each second-level index pointing to a next node within the jump list that also includes a second-level index, and wherein some nodes within the jump list do not include a second-level index,
wherein a plurality of nodes within the nodes in the jump list each further comprise a third-level index, each third-level index pointing to a next node within the jump list that also includes a third-level index, and wherein those storage segments that are inserted between a sequential pair of nodes within the jump list that each include a third-level index are all flushed by a single thread in a single flush, and wherein those storage segments that are inserted between a sequential pair of nodes within the jump list that include a second-level index are all flushed to a single stripe.

8. The electronic device according to claim 7, wherein the actions further comprise:

allocating a total number of threads corresponding to a total number of nodes in the jump list that each include a third-level index; and flushing, using the allocated threads, the storage elements inserted into the jump list.

9. The electronic device according to claim 6, wherein flushing the list to be flushed for the corresponding maturity level in the plurality of lists to be flushed to the disk array comprises:

flushing data that has been written in the storage segment inserted in the list to be flushed to the storage address of the disk array indicated by the storage segment.

10. The electronic device according to claim 6, wherein the actions further comprise:

in response to an increase in the number of data-written blocks in the storage segment, updating the maturity level of the storage segment; and based on the updated maturity level of the storage segment, inserting the storage segment into the list to be flushed corresponding to the updated maturity level.

11. A computer program product having a non-transitory computer readable medium which stores a set of instructions to flush data; the set of instructions, when carried out by computerized circuitry, causing the computerized circuitry to perform a method of:

inserting, based on a maturity level of a storage segment, the storage segment into a list to be flushed having a corresponding maturity level corresponding to the maturity level of the storage segment in a plurality of lists to be flushed, individual ones of the plurality of lists to be flushed respectively corresponding to different maturity levels, and the maturity level at least indicating a proportion of the number of data-written blocks to the total number of blocks of the storage segment, wherein inserting the storage segment into the list based on the maturity level comprises:

in response to the proportion being greater than a threshold proportion, inserting, based on the maturity level and a storage address indicated by the storage segment, the storage segment into a jump list corresponding to the maturity level, wherein the jump list comprises a plurality of nodes, wherein the jump list is one of the plurality of lists to be flushed, wherein the inserting is performed at least in part by comparing the storage address indicated by the storage segment to at least one storage address indicated by at least one other storage segment that was previously inserted into the jump list, in order to identify a node within the jump list into which the storage segment is inserted; and flushing the list to be flushed for the corresponding maturity level in the plurality of lists to be flushed into a disk array according to a descending order of the maturity levels.

* * * * *

UNITED STATES PATENT AND TRADEMARK OFFICE
CERTIFICATE OF CORRECTION

| | | |
|---|---|---|
| PATENT NO. | : 12,175,113 B2 | |
| APPLICATION NO. | : 17/824317 | |
| DATED | : December 24, 2024 | |
| INVENTOR(S) | : Zhou et al. | |

It is certified that error appears in the above-identified patent and that said Letters Patent is hereby corrected as shown below:

On the Title Page

Item (73) Assignee, Please change "Dell Products L.P." to --EMC IP holding Company LLC--.

Signed and Sealed this
Fourth Day of November, 2025

John A. Squires
*Director of the United States Patent and Trademark Office*